(12) United States Patent
Zhang et al.

(10) Patent No.: US 11,112,651 B1
(45) Date of Patent: Sep. 7, 2021

(54) LIQUID CRYSTAL DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Xin Zhang, Shenzhen (CN); Hu Dou, Shenzhen (CN); Chunchi Chen, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/976,438

(22) PCT Filed: May 11, 2020

(86) PCT No.: PCT/CN2020/089636
§ 371 (c)(1),
(2) Date: Aug. 27, 2020

(30) Foreign Application Priority Data

Apr. 14, 2020 (CN) .......................... 202010288846.5

(51) Int. Cl.
*G02F 1/1335* (2006.01)
*G02F 1/13357* (2006.01)

(52) U.S. Cl.
CPC .. *G02F 1/133606* (2013.01); *G02F 1/133607* (2021.01)

(58) Field of Classification Search
None
See application file for complete search history.

(56) References Cited

U.S. PATENT DOCUMENTS

2008/0284715 A1* 11/2008 Kawata ................. G02F 1/1336
345/102
2019/0331945 A1* 10/2019 Fang ..................... G02F 1/1336

FOREIGN PATENT DOCUMENTS

| CN | 1748179 | A | 3/2006 |
| CN | 101430455 | A | 5/2009 |
| CN | 103185982 | A | 7/2013 |
| CN | 105116586 | A | 12/2015 |
| CN | 107636517 | A | 1/2018 |
| JP | H0815677 | A | 1/1996 |

* cited by examiner

*Primary Examiner* — James A Dudek
(74) *Attorney, Agent, or Firm* — PV IP PC; Wei Te Chung; Ude Lu

(57) ABSTRACT

A liquid crystal display device provided by the present invention includes a backlight source, a light path modulation box and a liquid crystal display panel. The light path modulation box is disposed on the backlight source. The light path modulation box is configured to modulate light emitted out from the backlight source such that backlight is emitted out along a direction perpendicular to the light path modulation box. The liquid crystal display panel is disposed on the light path modulation box. The backlight emitted by the backlight source passes through the light path modulation box and enters the liquid crystal display panel.

6 Claims, 3 Drawing Sheets

LIQUID CRYSTAL DISPLAY DEVICE

RELATED APPLICATIONS

This application is a National Phase of PCT Patent Application No. PCT/CN2020/089636 having international filing date of May 11, 2020, which claims the benefit of priority of Chinese Patent Application No. 202010288846.5 filed on Apr. 14, 2020. The contents of the above applications are all incorporated by reference as if fully set forth herein in their entirety.

FIELD OF INVENTION

The present invention relates to a field of displays, specifically relates to a liquid crystal display device.

BACKGROUND OF INVENTION

A liquid crystal display device is an active matrix liquid crystal display driven by thin film transistors, and it generates points, lines, and surfaces with a back lamp to form images mainly by using current to excite liquid crystal molecules. Therefore, the conventional liquid crystal display device is generally a passive light emitting device, and has no self-luminescence characteristics and must acquire a display capability depending on light emission of a light source in the backlight module. Thus, a brightness of the LCD is determined by the backlight module thereof.

However, when the liquid crystal display device uses the backlight module to acquire a display performance, because light of the liquid crystal display panel emitted from the backlight module into the liquid crystal display device is not fully perpendicularly incident, a certain brightness crosstalk phenomenon occurs.

Therefore, solving an issue of a brightness crosstalk phenomenon existing in the conventional liquid crystal display device is a hardship that the display panel manufacturers in the world are trying hard to overcome.

SUMMARY OF INVENTION

Technical Issue

The present invention provides a liquid crystal display device that can solve a technical issue of a brightness crosstalk phenomenon existing in the conventional liquid crystal display device.

Technical Solution

The present invention provides a liquid crystal display device, comprising:

a backlight source;

a light path modulation box, disposed on the backlight source, wherein the light path modulation box is configured to modulate backlight emitted by the backlight source such that the backlight is emitted out along a direction perpendicular to the light path modulation box, the light path modulation box comprises a first substrate, a second substrate, and a liquid crystal layer disposed between the first substrate and the second substrate, wherein the first substrate comprises a first base, a pixel electrode layer disposed on the first base, and a dielectric layer disposed on the pixel electrode layer, and the second substrate comprises a second base and a common electrode layer disposed on the second base; and a liquid crystal display panel, disposed on the light path modulation box, wherein the backlight emitted by the backlight source enters the liquid crystal display panel through the light path modulation box, and two polarizers are disposed respectively on a surface of the light path modulation box near the liquid crystal display panel and a surface of the light path modulation box near the backlight source.

In the liquid crystal display device provided by the present invention, the liquid crystal layer comprises a plurality of liquid crystal molecules, and the liquid crystal molecules are arranged in an array.

In the liquid crystal display device provided by the present invention, a refractive index of the dielectric layer is greater than a normal refractive index of the liquid crystal molecules, and the refractive index of the dielectric layer is equal to an abnormal refractive index of the liquid crystal molecules.

In the liquid crystal display device provided by the present invention, a thickness of the liquid crystal layer is greater than or equal to a thickness of the dielectric layer.

In the liquid crystal display device provided by the present invention, the pixel electrode layer comprises a plurality of pixel electrodes disposed at intervals, a gap is defined between adjacent two of the pixel electrodes, and the dielectric layer forms a curved structure in the gap.

In the liquid crystal display device provided by the present invention, the dielectric layer comprises a plurality of dielectric blocks, the pixel electrodes correspond to the dielectric blocks, and each of the pixel electrodes is disposed one of the dielectric blocks; and in adjacent two of the dielectric blocks, both the two dielectric blocks extend into the gap to form the curved structures.

In the liquid crystal display device provided by the present invention, the curved structure comprises a first portion and a second portion disposed opposite to each other, and both the first portion and the second portion are curved.

In the liquid crystal display device provided by the present invention, the liquid crystal display device comprises a normal display status and a abnormal modulation status;

when the liquid crystal display device is in the normal display status, a longitudinal axis of the liquid crystal molecules is parallel to a first direction, and the first direction is a direction parallel to a boundary line between the liquid crystal layer and the second substrate; and when the liquid crystal display device is in the abnormal modulation status, the longitudinal axis of the liquid crystal molecules is parallel to a second direction, the second direction is a direction perpendicular to the boundary line between the liquid crystal layer and the second substrate.

The present invention provides a liquid crystal display device, comprising:

a backlight source;

a light path modulation box, disposed on the backlight source, wherein the light path modulation box is configured to modulate backlight emitted by the backlight source such that the backlight is emitted out along a direction perpendicular to the light path modulation box; and a liquid crystal display panel, disposed on the light path modulation box, wherein the backlight emitted by the backlight source enters the liquid crystal display panel through the light path modulation box.

In the liquid crystal display device provided by the present invention, the light path modulation box comprises a first substrate, a second substrate, and a liquid crystal layer disposed between the first substrate and the second substrate; and the first substrate comprises a first base, a pixel electrode layer disposed on the first base, and a dielectric layer disposed on the pixel electrode layer, and the second substrate comprises a second base and a common electrode layer disposed on the second base.

In the liquid crystal display device provided by the present invention, the liquid crystal layer comprises a plurality of liquid crystal molecules, and the liquid crystal molecules are arranged in an array.

In the liquid crystal display device provided by the present invention, a refractive index of the dielectric layer is greater than a normal refractive index of the liquid crystal molecules, and the refractive index of the dielectric layer is equal to an abnormal refractive index of the liquid crystal molecules.

In the liquid crystal display device provided by the present invention, a thickness of the liquid crystal layer is greater than or equal to a thickness of the dielectric layer.

In the liquid crystal display device provided by the present invention, the pixel electrode layer comprises a plurality of pixel electrodes disposed at intervals, a gap is defined between adjacent two of the pixel electrodes, and the dielectric layer forms a curved structure in the gap.

In the liquid crystal display device provided by the present invention, the dielectric layer comprises a plurality of dielectric blocks, the pixel electrodes correspond to the dielectric blocks, and each of the pixel electrodes is disposed one of the dielectric blocks; and in adjacent two of the dielectric blocks, both the two dielectric blocks extend into the gap to form the curved structures.

In the liquid crystal display device provided by the present invention, the curved structure comprises a first portion and a second portion disposed opposite to each other, and both the first portion and the second portion are curved.

In the liquid crystal display device provided by the present invention, the liquid crystal display device comprises a normal display status and a abnormal modulation status;

when the liquid crystal display device is in the normal display status, a longitudinal axis of the liquid crystal molecules is parallel to a first direction, and the first direction is a direction parallel to a boundary line between the liquid crystal layer and the second substrate; and when the liquid crystal display device is in the abnormal modulation status, the longitudinal axis of the liquid crystal molecules is parallel to a second direction, the second direction is a direction perpendicular to the boundary line between the liquid crystal layer and the second substrate.

In the liquid crystal display device provided by the present invention, two polarizers are disposed respectively on a surface of the light path modulation box near the liquid crystal display panel and a surface of the light path modulation box near the backlight source.

Advantages

In the liquid crystal display device provided by the present invention, by disposing the light path modulation box between the backlight source and the liquid crystal display panel to modulate light emitted from the backlight source to the liquid crystal display panel so that the obliquely emitted light from the backlight source enters the liquid crystal display panel along a direction perpendicular to the liquid crystal display panel, solves the technical issue of the brightness crosstalk phenomenon existing in the conventional liquid crystal display device.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

Figure 1:
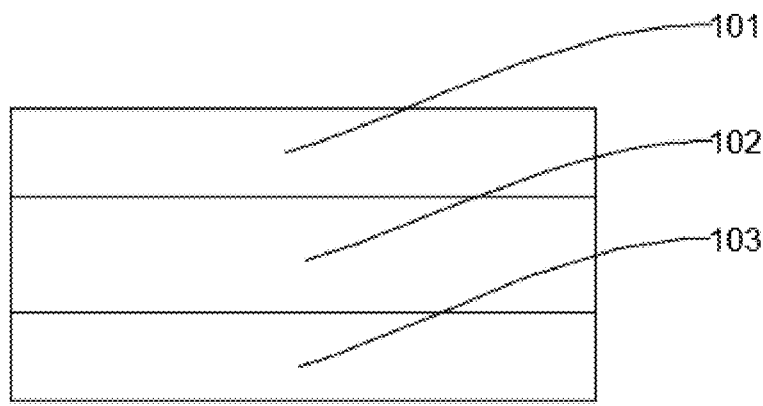
FIG. 1 is a schematic structural view of a liquid crystal display device provided by an embodiment of the present invention.

With reference to FIG. 1, FIG. 1 is a schematic structural view of a liquid crystal display device provided by the embodiment of the present invention. As shown in FIG. 1, the liquid crystal display device provided by the embodiment of the present invention comprises: a backlight source 101, a light path modulation box 102, and a liquid crystal display panel 103. The light path modulation box 102 is disposed on the backlight source 101. The liquid crystal display panel 103 is disposed on the light path modulation box 102. The light path modulation box 102 is configured to modulate backlight emitted from the backlight source 101 such that the backlight is emitted out from a direction perpendicular to the light path modulation box 102. Furthermore, the backlight emitted out from the backlight source 101 enters the liquid crystal display panel 103 through the light path modulation box 102.

It can be understood that light emitted from the backlight source 101 has not only light emitted along a direction perpendicular to the light path modulation box 102 but also light emitted along an oblique direction. Such obliquely emitted light would be entirely blocked by a polarizer, and therefore a brightness crosstalk phenomenon occurs on the liquid crystal display panel 103. After addition of the light path modulation box 102, the light emitted from the backlight source 101 is modulated by the light path modulation box 102 before entering the liquid crystal display panel 103 such that the light emitted from the backlight source 101 is emitted out along the direction perpendicular to the light path modulation box 102. As such the polarizer can block the light not required to enter the liquid crystal display panel 103, which reduces occurrence of the brightness crosstalk phenomenon and improves the display effect of the liquid crystal display panel 103.

Figure 2:
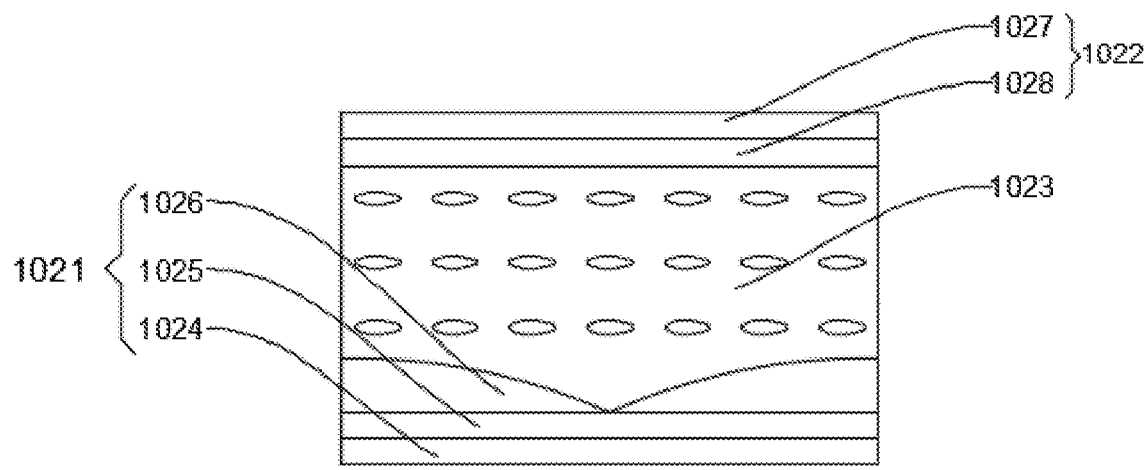
FIG. 2 is a schematic structural view of a light path modulation box provided by the embodiment of the present invention.

Specifically, with reference to FIG. 2, FIG. 2 is a schematic structural view of a light path modulation box provided by the embodiment of the present invention. The light path modulation box 102 provided by the present invention comprises: a first substrate 1021, a second substrate 1022, and a liquid crystal layer 1023 disposed on the first substrate 1021 and the second substrate 1022. The first substrate 1021 comprises a first base 1024, a pixel electrode layer 1025 disposed on the first base 1024, and a dielectric layer 1026 disposed on the pixel electrode layer 1025. The second substrate 1022 comprises a second base 1027 and a common electrode layer 1028 disposed on the second base 1027.

In an embodiment, the liquid crystal layer 1023 comprises a plurality of liquid crystal molecules, and the liquid crystal molecules are arranged in an array. The liquid crystal molecules optionally employs nematic liquid crystal or blue-phase liquid crystal. When the nematic liquid crystal is selected, positive or negative liquid crystal is used.

In an embodiment, a refractive index of the dielectric layer 1026 is greater than a normal refractive index of the liquid crystal molecules, and the refractive index of the dielectric layer 1026 is equal to an abnormal refractive index of the liquid crystal molecules. The liquid crystal molecules have two refractive indexes, which is the so-called anisotropy of dielectric medium in the electric field. However, in the optical field, it is so-called birefringence. The two refractive indexes owned by the liquid crystal molecules are the normal refractive index and abnormal refractive index respectively. The normal refractive index refers to a refractive index along a short direction of the liquid crystal molecules, and the abnormal refractive index refers to a refractive index along a longitudinal axis direction of the liquid crystal molecules. The abnormal refractive index of the liquid crystal molecules is greater the normal refractive index of the liquid crystal molecules.

In an embodiment, a thickness of the liquid crystal layer 1023 is greater than or equal to a thickness of the dielectric layer 1026. Because the liquid crystal layer 1023 is required to flatten the dielectric layer 1026, the thickness of the liquid crystal layer 1023 is required to greater than the thickness of the dielectric layer 1026.

Figure 3:
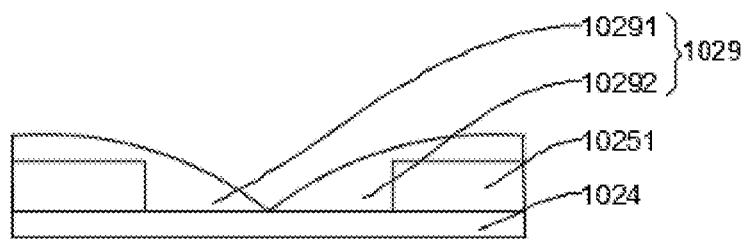
FIG. 3 is a schematic structural view of a first substrate provided by the embodiment of the present invention.

Specifically, with reference to FIG. 3, FIG. 3 is a schematic structural view of a first substrate provided by the embodiment of the present invention, wherein the pixel electrode layer 1025 comprises a plurality of pixel electrodes 10251 disposed at intervals, and a gap is defined adjacent two of the pixel electrodes 10251. The dielectric layer 1026 forms a curved structure 1029 in the gap. The curved structure 1029 comprises a first portion 10291 and a second portion 10292 disposed opposite to each other, and both the first portion 10291 and the second portion 10292 are curved.

In an embodiment, the dielectric layer 1026 is coated and formed on an entire surface of the pixel electrode layer 1025 after formation of the pixel electrode layer 1025, and forms the curved structure 1029 in the gap.

It can be understood that the curved structure 1029 formed by the dielectric layer 1026 is determined by the light emitted out from the backlight source 101. An oblique angle of light emitted out from the backlight source 101 becomes greater from an inside to an outside, and therefore the oblique angle of the light emitted out form the dielectric layer 1026 is curved such that, all light emitted out from the backlight source 101 at the oblique angle is modulated as possible to be emitted out along the direction perpendicular to the light path modulation box 102.

Figure 4:
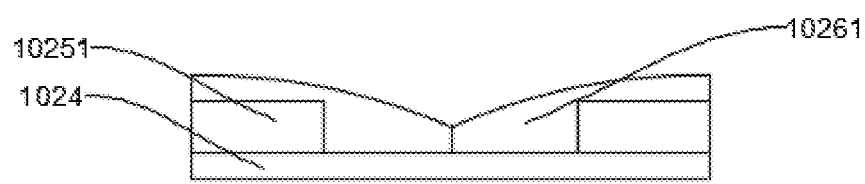
FIG. 4 is another schematic structural view of the first substrate provided by the embodiment of the present invention.

Furthermore, with references to FIGS. 3 and 4, FIG. 4 is another schematic structural view of the first substrate provided by the embodiment of the present invention. A difference between the first substrate shown in FIG. 4 from the first substrate shown in FIG. 3 is that the dielectric layer 1026 comprises a plurality of dielectric blocks 10261, the pixel electrodes 10251 correspond to the dielectric blocks 10261, and the dielectric blocks 10261 are disposed on the pixel electrodes 10251 respectively.

It can be understood that the dielectric blocks 10261 are arranged regularly, and the dielectric blocks 10261 are coated respectively on the pixel electrodes 10251 after the formation of the pixel electrodes 10251. One of the dielectric blocks 10261 is disposed on each of the pixel electrodes 10251. In adjacent two of the dielectric blocks 10261, both the two dielectric blocks 10261 extend into the gap to form the curved structures to modulate the light emitted out from the backlight source 101 以 at the oblique angle as possible to be emitted out the direction perpendicular to the light path modulation box 102.

Figure 5:
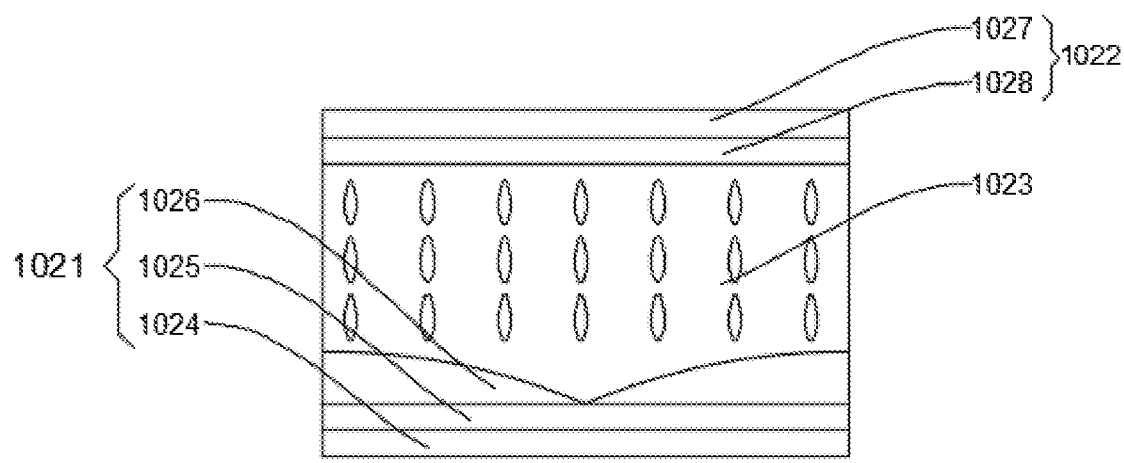
FIG. 5 is another schematic structural view of a light path modulation box provided by the embodiment of the present invention.

Furthermore, with reference to FIGS. 2 and 5, FIG. 5 is another schematic structural view of a light path modulation box provided by the embodiment of the present invention. A difference of the light path modulation box shown in FIG. 5 from the light path modulation box shown in FIG. 2 is the different directions of the longitudinal axes of the liquid crystal molecules in the liquid crystal layers 1023. In FIG. 2, the longitudinal axis of the liquid crystal molecules is parallel to a first direction, and the first direction is a direction parallel to a boundary line between the liquid crystal layer 1023 and the second substrate 1022. In FIG. 5, the longitudinal axis of the liquid crystal molecules is parallel to a second direction, and the second direction is a direction perpendicular to the boundary line between the liquid crystal layer 1023 and the second substrate 1022.

It can be understood that the liquid crystal display device has an abnormal modulation status and a normal display status. When the liquid crystal display device light path modulation box is in the normal display status, the longitudinal axis of the liquid crystal molecules is parallel to the first direction, the first direction is a direction parallel to the boundary line between the liquid crystal layer 1023 and the dielectric layer 1025, and the refractive index of the dielectric layer 1025 is equal to the abnormal refractive index of the liquid crystal molecules. Therefore, when the light emitted out from the backlight source 101 enters the liquid crystal layer 1023 the through the dielectric layer 1025, the light is transmitted like transmission in the same medium. Thus, the light emitted out from the backlight source 101 has no change to the light path after passing through the light path modulation box 102. When the liquid crystal display device is in the abnormal modulation status, the light path of the light emitted out from the backlight source 101 requires modulation. In the meantime the longitudinal axis of the liquid crystal molecules is parallel to the second direction, the second direction is a direction perpendicular to the boundary line between the liquid crystal layer 1023 and the dielectric layer 1025, and the refractive index of the dielectric layer 1025 is greater than the normal refractive index of the liquid crystal molecules. Therefore, when the light emitted out from the backlight source 101 enters the liquid crystal layer 1023 through the dielectric layer 1025, the light is transmitted from an optically dense medium to an optically sparse medium, and the light obliquely emitted out from the backlight source 101 is emitted outward along the direction perpendicular to the light path modulation box 102, which achieves reduction of light crosstalk phenomenon.

Specific steps for mitigating brightness crosstalk provided by the liquid crystal display device provided by the embodiment of the present invention are that the liquid crystal display device provides vertical alternating current to the pixel electrode layer 1025 and the common electrode layer 1028 such that a constant voltage difference exists between the pixel electrodes in the pixel electrode layer 1025 and the common electrodes in the common electrode layer 1028 to generate an electrical field. The liquid crystal molecules in the liquid crystal layer 1023 deflect under the effect of the electrical field, the direction of the longitudinal axis of the liquid crystal molecules deflects from the first direction to the second direction, the first direction is a direction parallel to the boundary line between the liquid crystal layer 1023 and the second substrate 1022, and the second direction is a direction perpendicular to the boundary line between the liquid crystal layer 1023 and the second substrate 1022; in the meantime, the light obliquely emitted out from the backlight source 101 passes through the light path modulation box 102, and is emitted out toward the liquid crystal display panel 103 along a direction perpendicular to the light path modulation box 102 to solve the brightness crosstalk phenomenon of the liquid crystal display device.

Figure 6:
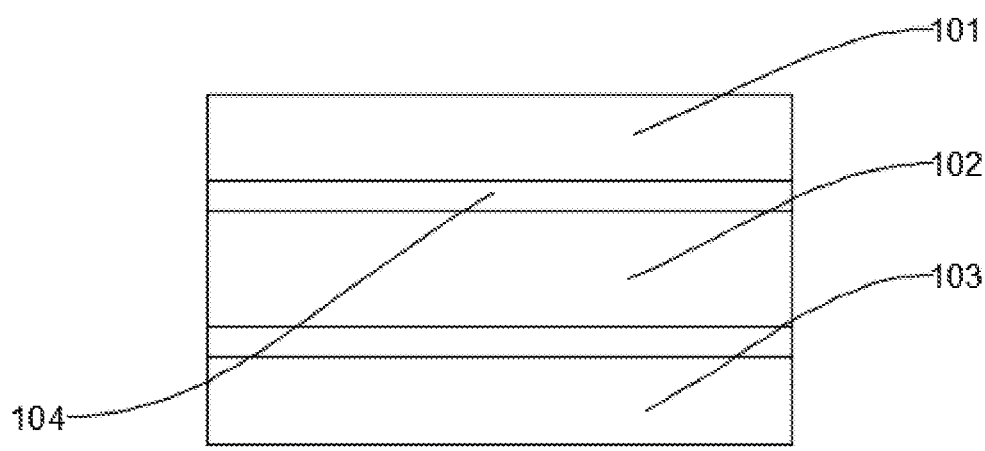
FIG. 6 is another schematic structural view of a liquid crystal display device provided by the embodiment of the present invention.

Furthermore, with reference to FIGS. 1 and 6, FIG. 6 is another schematic structural view of a liquid crystal display device provided by the embodiment of the present invention. A difference of the liquid crystal display device shown in FIG. 6 from the liquid crystal display device shown in FIG. 1 is that two polarizers 104 are disposed respectively on a surface of a side of the light path modulation box 102 near the liquid crystal display panel 103 and a surface of a side of the light path modulation box 102 near the backlight source 101.

It can be understood that the polarizer 104 is configured to block light emitted from the backlight source 101 when the liquid crystal display device is in a status of dark display effect.

In the liquid crystal display device provided by the present invention, by disposing the light path modulation box between the backlight source and the liquid crystal display panel to modulate light emitted from the backlight source to the liquid crystal display panel so that the obliquely emitted light from the backlight source enters the liquid crystal display panel along a direction perpendicular to the liquid crystal display panel, solves the technical issue of the brightness crosstalk phenomenon existing in the conventional liquid crystal display device.

The embodiments of the present invention are described above. In the specification, the specific examples are used to explain the principle and embodiment of the present invention. The above description of the embodiments is only used to help understand the method of the present invention and its spiritual idea. Meanwhile, for those skilled in the art, according to the present the idea of invention, changes will be made in specific embodiment and application. In summary, the contents of this specification should not be construed as limiting the present invention.

What is claimed is:

1. A liquid crystal display device, comprising:
   a backlight source;
   a light path modulation box, disposed on the backlight source, wherein the light path modulation box is configured to modulate backlight emitted by the backlight source such that the backlight is emitted out along a direction perpendicular to the light path modulation box, the light path modulation box comprises a first substrate, a second substrate, and a liquid crystal layer disposed between the first substrate and the second substrate, wherein the first substrate comprises a first base, a pixel electrode layer disposed on the first base, and a dielectric layer disposed on the pixel electrode layer, and the second substrate comprises a second base and a common electrode layer disposed on the second base; and
   a liquid crystal display panel, disposed on the light path modulation box, wherein the backlight emitted by the backlight source enters the liquid crystal display panel through the light path modulation box, and two polarizers are disposed respectively on a surface of the light path modulation box near the liquid crystal display panel and a surface of the light path modulation box near the backlight source;
   wherein the pixel electrode layer comprises a plurality of pixel electrodes disposed at intervals, a gap is defined between adjacent two of the pixel electrodes, and the dielectric layer forms a curved structure in the gap;
   wherein the curved structure comprises a first portion and a second portion disposed symmetrically opposite to each other in the gap, and both the first portion and the second portion are curved and are substantially quarter-circular in shape.

2. The liquid crystal display device as claimed in claim 1, wherein the liquid crystal layer comprises a plurality of liquid crystal molecules, and the liquid crystal molecules are arranged in an array.

3. The liquid crystal display device as claimed in claim 2, wherein a refractive index of the dielectric layer is greater than a normal refractive index of the liquid crystal molecules, and the refractive index of the dielectric layer is equal to an abnormal refractive index of the liquid crystal molecules.

4. The liquid crystal display device as claimed in claim 1, wherein a thickness of the liquid crystal layer is greater than or equal to a thickness of the dielectric layer.

5. The liquid crystal display device as claimed in claim 1, wherein
   the dielectric layer comprises a plurality of dielectric blocks, the pixel electrodes correspond to the dielectric blocks, and each of the pixel electrodes is disposed in one of the dielectric blocks; and
   in adjacent two of the dielectric blocks, both the two dielectric blocks extend into the gap to form the curved structures.

6. The liquid crystal display device as claimed in claim 2, wherein
   the liquid crystal display device comprises a normal display status and an abnormal modulation status;
   when the liquid crystal display device is in the normal display status, a longitudinal axis of the liquid crystal molecules is parallel to a first direction, and the first direction is a direction parallel to a boundary line between the liquid crystal layer and the second substrate; and when the liquid crystal display device is in the abnormal modulation status, the longitudinal axis of the liquid crystal molecules is parallel to a second direction, the second direction is a direction perpendicular to the boundary line between the liquid crystal layer and the second substrate.

* * * * *